United States Patent [19]

Tolstoy et al.

[11] Patent Number: 5,355,312

[45] Date of Patent: Oct. 11, 1994

[54] INVERSE TOMOGRAPHY BY MATCHED FIELD PROCESSING

[75] Inventors: Alexandra I. Tolstoy, Annandale, Va.; Orest I. Diachok, Silver Spring, Md.; L. Neil Frazer, Kailua, Hi.

[73] Assignee: The United States of America as represented by the Secretary of the Navy, Washington, D.C.

[21] Appl. No.: 764,747

[22] Filed: Sep. 24, 1991

[51] Int. Cl.$^5$ .............................................. G06F 15/20
[52] U.S. Cl. .................... 364/420; 181/139; 73/602; 73/597; 367/117
[58] Field of Search .............. 364/420; 367/6, 117; 73/597, 602; 181/139

[56] References Cited

U.S. PATENT DOCUMENTS

| | | | |
|---|---|---|---|
| 2,276,974 | 3/1942 | Howard . | |
| 4,210,028 | 7/1980 | Hildebrand | 73/598 |
| 4,279,157 | 7/1981 | Schomberg | 73/618 |
| 4,328,707 | 5/1982 | Clement | 73/618 |
| 4,541,279 | 9/1985 | Schomberg | 73/597 |
| 4,562,540 | 12/1985 | Davaney | 364/400 |
| 4,594,662 | 6/1986 | Devaney | 364/400 |
| 4,755,944 | 7/1988 | Glass | 364/422 |
| 4,875,015 | 10/1989 | Ward | 364/422 |
| 4,995,011 | 2/1991 | Spiesberger | 367/127 |
| 5,095,466 | 3/1992 | Julien et al. | 367/24 |

OTHER PUBLICATIONS

Bucker, "Use of Calculated Sound Fields and Matched-Field Detection to Locate Sound Sources in Shallow Water", 1976, J. Acoust. Soc. Am., vol. 59, pp. 368–373.

Fizell, "Application of High-Resolution Processing to Range and Depth Estimation Using Ambiguity Function Methods", J. Acoust. Soc. Am., vol. 82, pp. 606–613.

Munk & Wunsch, "Ocean Acoustic Tomography: A Scheme for Large Scale Monitoring" 1979, Deep Sea Research, vol. 26A, pp. 123–161.

A. Tolstoy and O. Diachok, "Acoustic tomography via matched field processing", J. Acoust. Soc. Am. 89(3), Mar. 1991, pp. 1119–1127.

Primary Examiner—Donald E. McElheny, Jr.
Assistant Examiner—J. L. Hazard
Attorney, Agent, or Firm—Thomas E. McDonnell; Daniel Kalish

[57] ABSTRACT

To determine the speed of propagation of a signal in a medium, wave amplitude is measured over time at one or more detectors disposed within the medium so as to detect and identify signals transmitted at one or more sources disposed within said region. Frequency domain matched field processing power is calculated by matching measured with perturbation normal mode model fields, and beta coefficients which determine sound speed profiles are calculated by beta backpropagation so as to maximize the matched field processing power.

21 Claims, 11 Drawing Sheets

INVERSE TOMOGRAPHY BY MATCHED FIELD PROCESSING

BACKGROUND OF THE INVENTION

The present invention relates to systems and methods for determining the wave speed of a medium and more particularly to an inverse tomographic technique therefor.

The term tomography generally denotes the cross-sectional imaging of an object from either transmission or reflected data collected by illuminating the object from several different directions. Accordingly, inverse tomography involves transmitting signals through a medium and inferring the wave speed in the medium by examining detected signals.

The ocean has been extensively studied and mapped. However, most studies depend on knowledge of the actual sound speed in the ocean. Therefore, it is critical to have accurate knowledge of the sound speed of a region under consideration, so that knowledge of the structure of the region may also be accurate. Furthermore, the accuracy of sonar depends on the accuracy of knowledge about the ocean water sound speed. Similarly, knowledge of geological formations depends on measurements based on accurate knowledge of wave speed.

Techniques utilized in the past have shown that remote sensing of ocean mesoscale structures is highly effective at ranges up to 1000 km using high frequencies (above 100 Hz) where sound-speed structure is inverted (that is, determined) through comparison of measured with predicted times of arrival of rays/multipaths transmitted from a pulsed source and propagating to a detector. These approaches use either moored transmitter/detectors, or moving transmitter/detectors and involve computation in the time domain. In other words, these approaches involve calculation of the elapsed time between emission and receipt of signals. The detectors, whether moored or moving, are vertical hydrophone arrays, thus having multiple sensors.

The moored tomography technique requires resolution on the order of 10 msec. to detect the effects of environmental changes, and this demands broadband coded source signals with accurate synchronization of transmission and recordings. The data must be collected over long periods of time to counter fluctuations due to internal waves, tides, movement of fish and other material in the medium, and other environmental conditions. The location of the sources and detectors must be known precisely. The moored approach suffers from a sparsity of transmitters and detectors since deploying them is expensive. On the other hand, moving the transmitters and detectors, usually by ship, is time consuming and costly.

It would be desirable to use a number of fast, inexpensive air deployed explosives with high signal to noise ratio as the sources. However, these sources cannot be used with the above techniques because they do not provide precisely known times and locations, nor do they provide precisely known waveforms for the signals transmitted.

It would also be desirable to perform the calculations in the frequency domain with low frequencies, thus minimizing the sensitivity to environmental fluctuations and eliminating the necessity of knowing the precise locations for the sources and detectors, since the accuracy needed would depend on the wavelength, which would be longer. However, the above techniques use the time domain and require frequencies of about 100 Hz.

U.S. Pat. No. 4,995,001 to John L. Spiesberger discloses a method for determining, inter alia, the speed of propagation of a signal in a medium, where the medium is not necessarily ocean water and the signal is not necessarily acoustic. The method uses calculations in the time domain and uses moored transmissions. As with the above methods for use in ocean mesoscale structural determination, it provides relatively inaccurate results or requires the use of accurate data.

Matched field processing, examples of which include Capon processing, maximum likelihood, minimum variance, linear processing, and maximum entropy, has been used to locate sources. It involves cross-correlating, that is, comparing or matching actual measured data from signals, with theoretical predictions of the measured data, based on acoustic fields according to a particular propagation model, to obtain matched field processing power. Further explanation and details of matched field processing power are found in Bucker, H. P. (1976), "Use of Calculated Sound Fields and Matched-Field Detection to Locate Sound Sources in Shallow Water," J. Acoust. Soc. Am. 59, 368–373; Fizell, R. G., "Application of High-Resolution Processing to Range and Depth Estimation Using Ambiguity Function Methods," J. Acoust. Soc. Am. 82, 606–613, which are incorporated herein by reference. Matched field processing of interest herein is in the frequency domain.

The ocean is known to have sound speed profiles. In other words, it is known that the sound speed varies with depth because of factors such as temperature, pressure and salinity. FIG. 1 shows an example of a sound speed profile. However, the sound speed profile might vary with range. Accordingly, the region under consideration is partitioned into a discrete set of cells so that the sound speed profile can be determined at each cell.

Because the maximum sound speed is generally higher on the surface and in deep water, sound speed typically reaches a minimum at depths of about 500–1000 m, sound propagated horizontally will generally refract vertically and reflect from the surface, as shown in FIG. 2.

In order to reduce the parameter search space for determining the sound speed profile in each cell, wave speeds can be represented by a linear combination of known linearly independent functions, a basis. In other words, $$v(x, y, z) = v_{mean}(z) + \sum_{j=1}^{J} a_j(x, y) f_j(z).$$

For empirical orthogonal functions (E.O.F.s), the functions $f_j$ are eigenfunctions of a particular known covariance matrix. Since the functions $f_j$ are readily determined from air-deployed expendable bathythermograph data (A.X.B.T.), conductivity, temperature and depth (C.T.D.), or archival data, the problem of determining sound speed profiles which best match the measured data reduces to finding the coefficients $a_j$ for all cells and all values of j, which coefficient values maximize the matched field processing power. However, with this linear representation of wave speed, it is very cumbersome and inefficient to calculate the predicted acoustic fields, on which calculation of the matched field processing power is based.

Even if an efficient method of calculating the predicted acoustic fields and therefore matched field processing power were found, the problem of solving for coefficients which maximize the matched field processing power remains. Calculations using standard numerical schemes, including simulated annealing, are prohibitively time consuming. Even medical tomography backpropagation techniques, which involve considering many paths through a cell of interest, and weighting the paths equally, lead to inaccurate results.

SUMMARY OF THE INVENTION

Accordingly, it is an object of this invention to determine the speed of propagation of a signal through a medium (wave speed) at all positions within a region of said medium by using a small number of sources and detectors whose locations need not be accurately known, and by using signals whose time of transmission and whose waveforms need not be accurately known.

A further object of this invention is to determine wave speed by a method which is not effected by minor environmental disturbances.

A further object of this invention is to determine wave speed by using frequency domain matched field processing.

A further object of this invention is to determine wave speed by efficiently calculating acoustic fields.

A further object of this invention is to determine wave speed by iteratively solving for coefficients which characterize the region and which maximize the matched field processing power.

A further object of this invention is to determine ocean water sound-speed.

Still another object of this invention is to determine ocean water sound-speed by using a small number of fast, inexpensive, air deployed explosives with high signal to noise ratio, and performing the operation over a brief time period.

These and other objects of the present invention are achieved by transmitting signals from one or more transmitters at discrete locations within the region, and detecting said signals at one or more detectors at discrete locations within the region. The signals may be acoustic, electromagnetic, or of any other type, so long as each signal has a known harmonic component, propagated in the medium, and is associated with the source from which it was transmitted. In a preferred embodiment, the medium is ocean water, and the signals are acoustic signals with a 10-30 Hz frequency component (20 $\pi$ radians/sec $-60$ $\pi$ radians/sec angular frequency). Each detector measures wave amplitude over time and identifies the source from which each detected signal was transmitted. In the preferred embodiment, the detectors are vertically disposed hydrophone arrays.

The problem of determining wave speed within the region so as to best match transmitted and measured signals with predicted signals is made equivalent to the problem of solving for coefficients beta which maximize the frequency domain matched field processing power, by partitioning the region into a finite number of cells, each having an identifying cell number, and representing each position in the region by a cell number i and by a depth z. The wave speed at each position is expressed as a known function w of a plurality of unknown coefficients beta each identified with the cell number, and of the depth. In other words, $v_i(z) = w(\beta_1^i, \beta_2^i, \ldots, \beta_N^i, z)$. Once the coefficients beta are determined, then each cell has a wave speed profile—wave speed will vary in the cell as a function of depth.

In a preferred embodiment, matched field processing power is determined in accordance with a normal mode propagation model. The wave speed is characterized as $$v_i(z) = \frac{1}{\sqrt{h(z) + \sum_{j=1}^{N} \beta_j^i \cdot g_j(z)}},$$

wherein the functions h and $g_j$, for $1 \leq j \leq N$ are readily determined. This characterization provides for efficient determination of the normal mode wave numbers by perturbation. Such perturbation normal mode wave numbers provide efficient determination of the acoustic field for use in the normal mode propagation model to calculate the matched field processing power.

The matched field processing power $P_{s,d}$ is calculated by determining a correlation in the frequency domain between the measured signal and the predicted signal based on the acoustic field according to a propagation model and the wave speed. When the detectors are hydrophone arrays, each value of $P_{s,d}$ for source s and detector d in the preferred embodiment is based on contributions from all phones in the array.

The beta coefficients are then calculated to maximize $P_{s,d}$ for all sources s and detectors d. In the preferred embodiment, beta backpropagation is used to calculate beta by iteratively resetting each value of $\beta_j^i$ to a weighted average of coefficients which maximize $P_{s,d}$ for each source and detector combination where the signal from that source to that detector passes through cell $C_i$, where the weighting factor is the length of the path through that cell.

Once all values of the beta coefficients are determined, then the wave speed is readily calculated as $$v_i(z) = w(\beta_1^i \beta_2^i, \ldots, \beta_N^i, z).$$

Because this invention uses calculations in the frequency domain, it provides accurate results even when there are a small number of sources and detectors, when their locations are not accurately known, when the time of transmission of the signals are not accurately known, and when their waveforms are not accurately known. It is only necessary to know precisely their frequency component. For example, this invention provides for determination of ocean water sound speed over a mesoscale region (for example, 250 km $\times$ 250 km $\times$ 1000 m) by using a small number of fast, inexpensive, air deployed explosives with a high signal to noise ratio and a strong $20\pi$–$60\pi$ radians/sec angular frequency component, and by using hydrophone arrays as detectors. The procedure is performed over a brief period of time.

It is expected that this invention will provide advantages in all situations, such as medical tomography, in which it is desired to accurately determine the speed of propagation of a signal in a medium.

These together with other objects of the invention, along with the various features of novelty and advantages which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and features, objects and advantages other than those set forth above will become apparent when consideration is given to the following detailed description thereof. Such description makes reference to the annexed drawings wherein.

DETAILED DESCRIPTION OF THE PREFERRED EMBODIMENT

Figure 1:
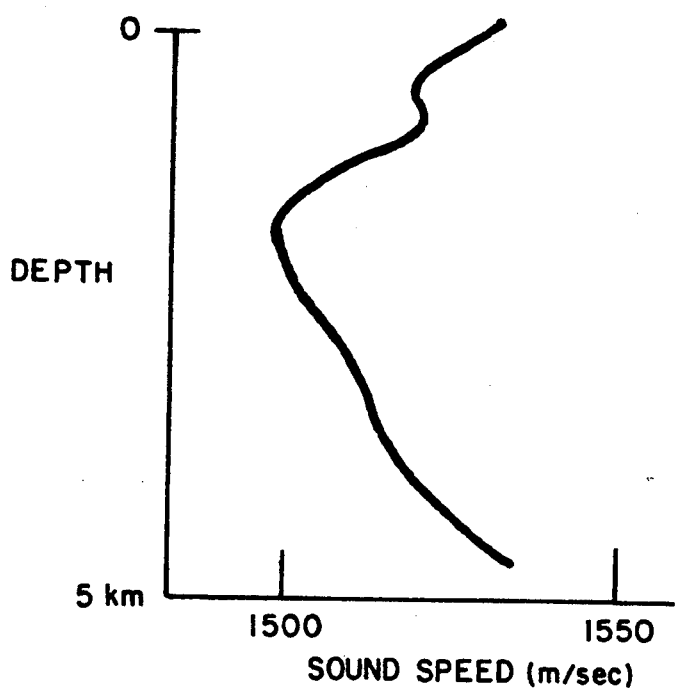
FIG. 1 shows a typical sound speed profile in the ocean.
Figure 2:
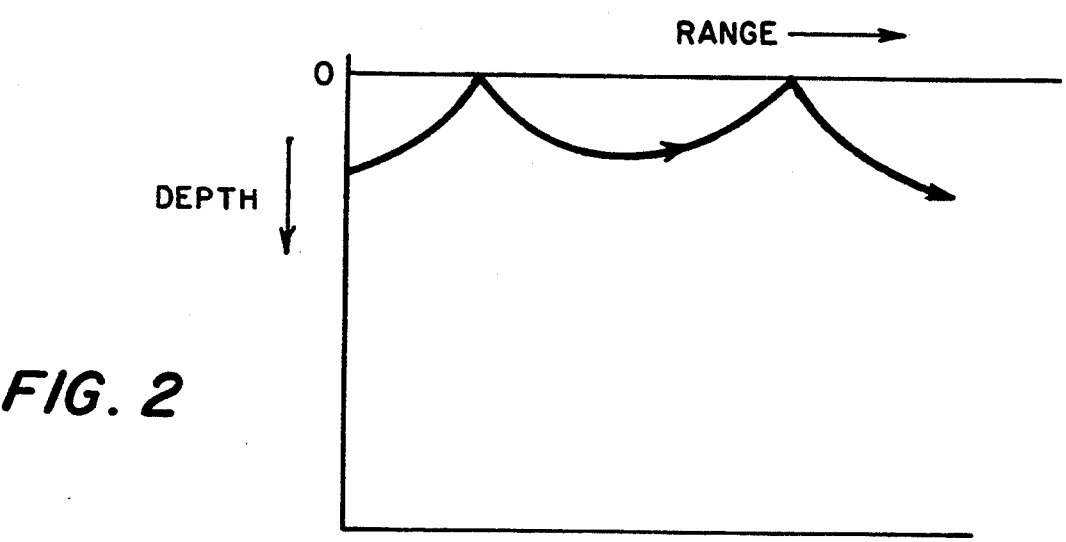
FIG. 2 shows the typical path of a horizontally propagated sound signal in the ocean.
Figure 3:
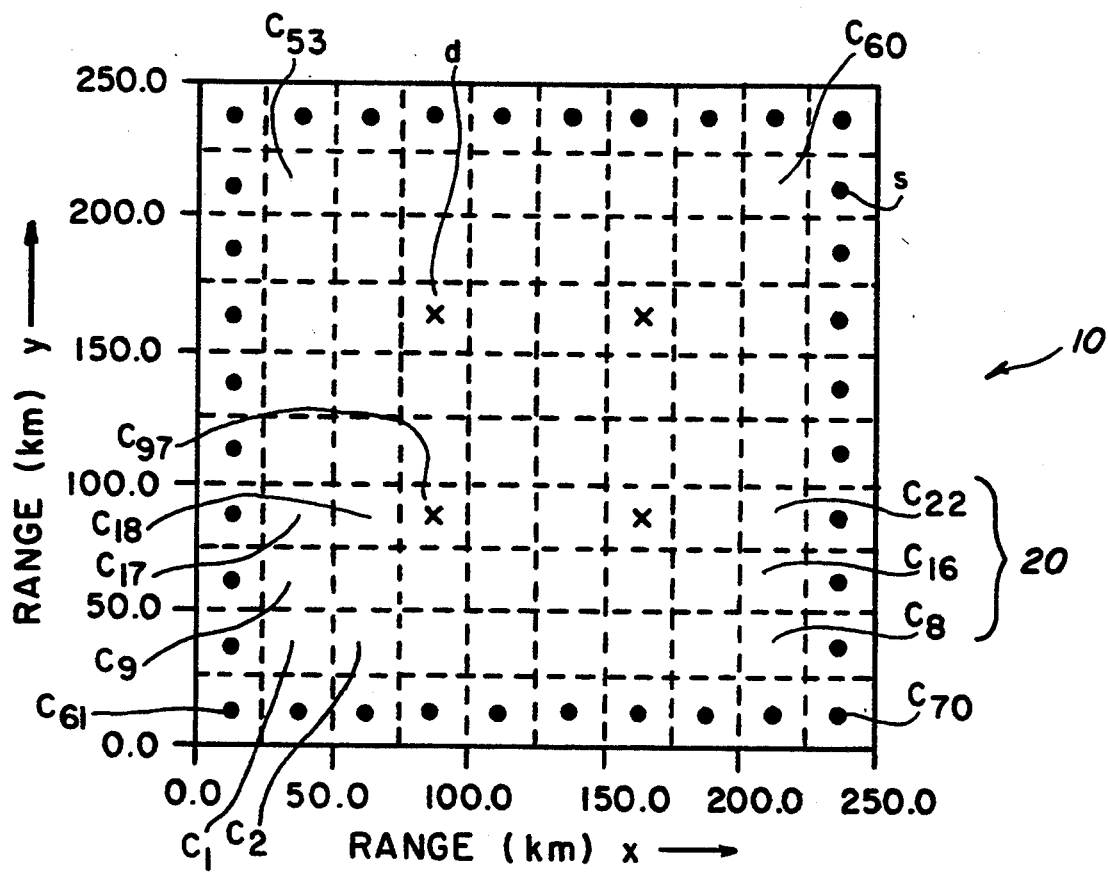
FIG. 3 shows a vertical view of the region in the horizonal plane.
Figure 4:
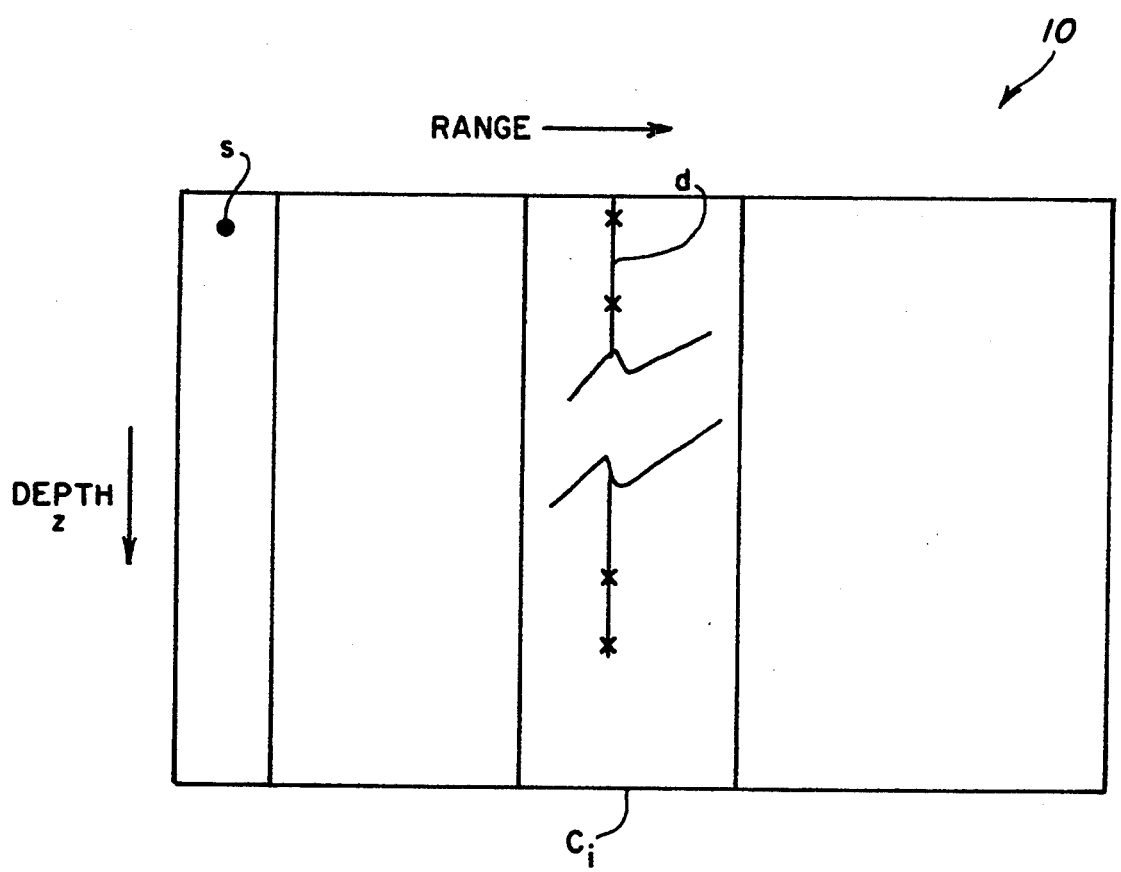
FIG. 4 shows a side view of the region.

Referring now to the drawings, the 3-dimensional mesoscale region (10) of the ocean in which it is desired to determine the speed of propagation of an acoustic signal therethrough (wave speed) is shown in FIGS. 3 and 4.

It is desired to study acoustic structures in the ocean over a region which is typically a rectangular solid with a range of 100-1000 km by 100-1000 km, and a depth of 1.00 km. In the example of inverse ocean tomography described in detail herein, the environment simulates a deep water north Pacific region with range 250 km by 250 km and depth 1.00 km.

The signal in question and the propagation medium may be of any type, so long as the signal propagates through the medium. For example, the signal might be of electromagnetic radiation, such as x-rays or light, or it might be acoustic or ultrasonic. The medium might, for example, be an optically transparent solid, a human body, water, or a land mass.

One or more sources (s) and one or more detectors (d) are disposed at discrete locations within the region (10).

Figure 5:
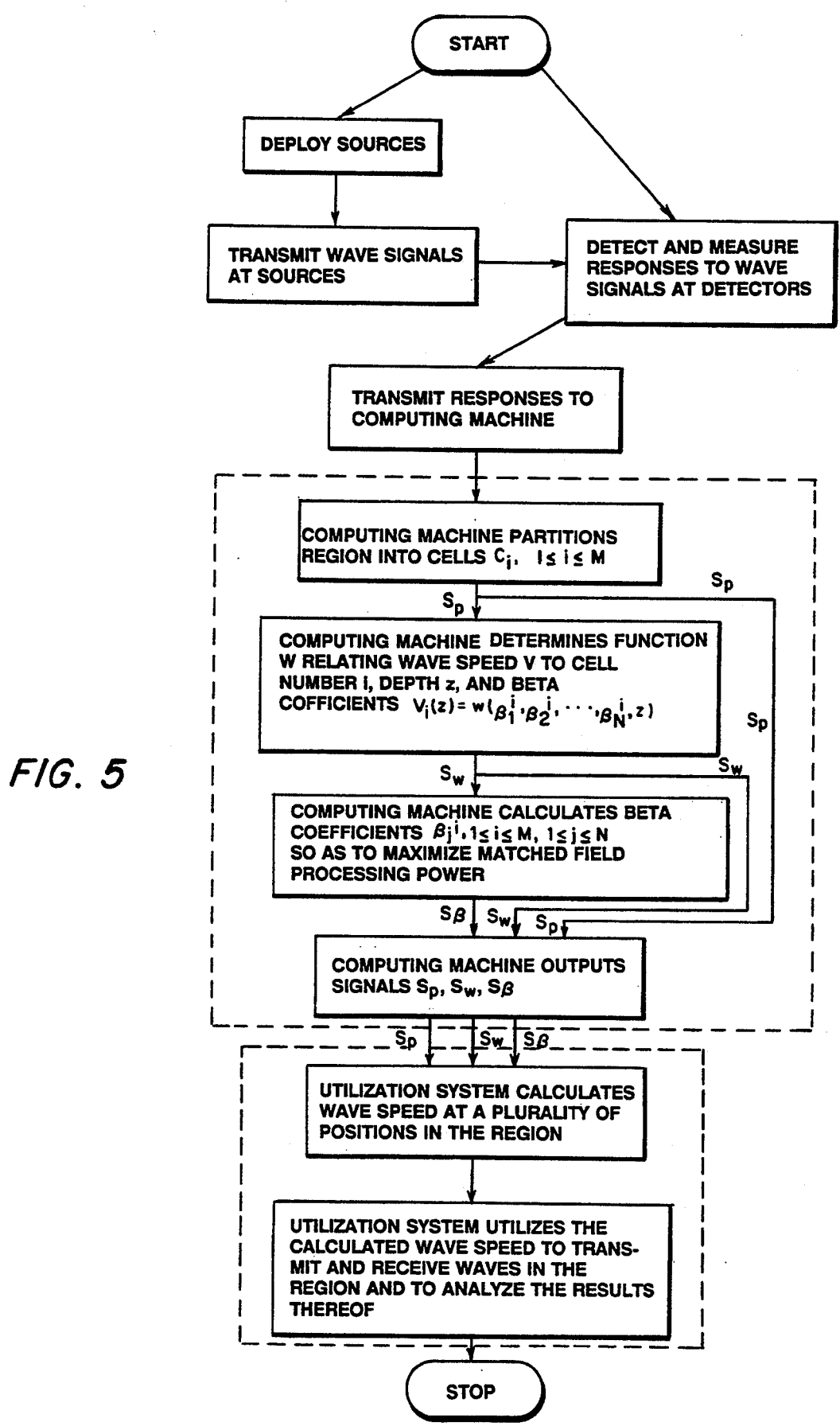
FIG. 5 shows in block diagram form, the overall method for determining sound speed.
Figure 6:
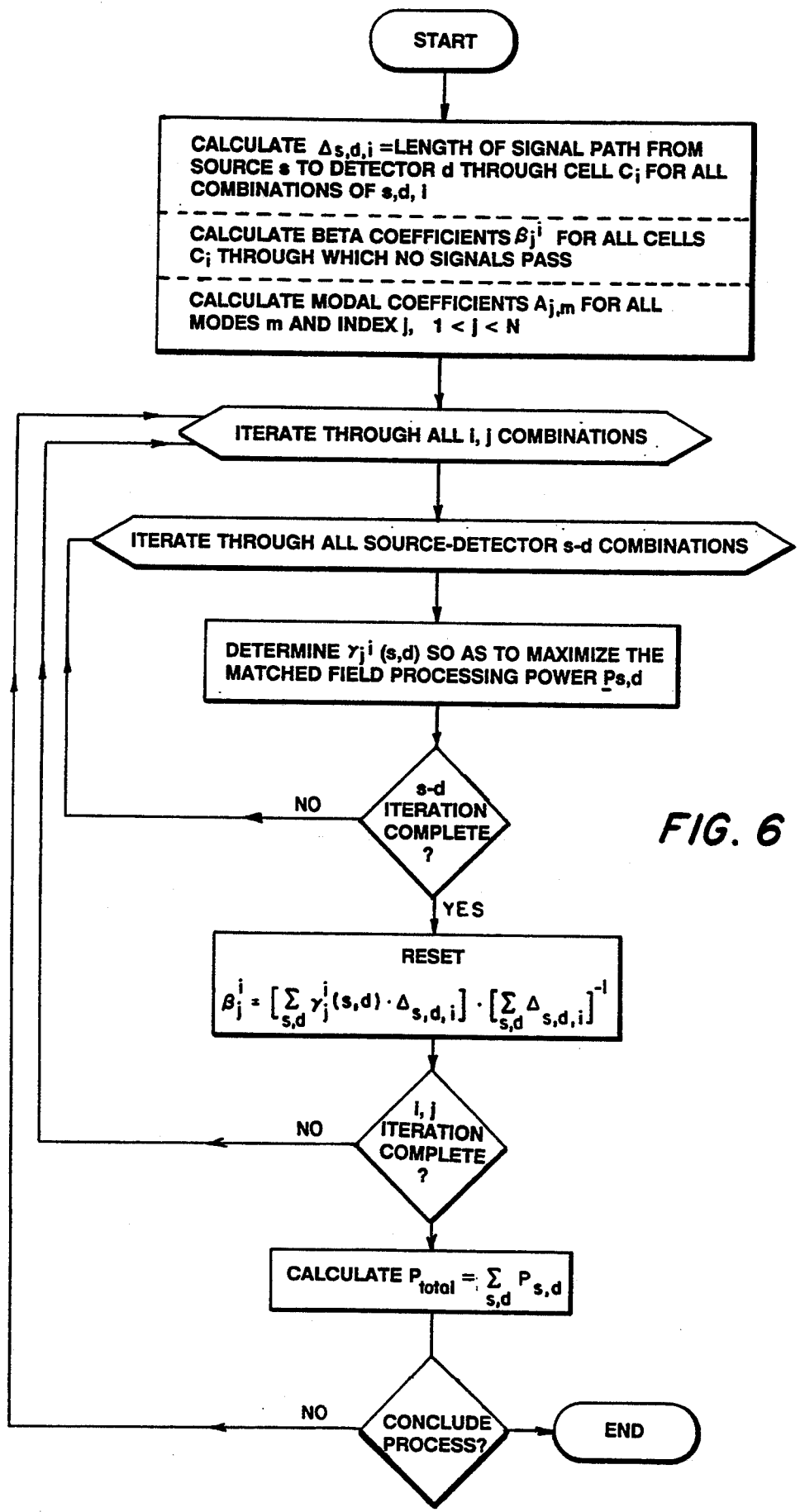
FIG. 6 shows in block diagram form, the method for calculating the beta coefficients using the beta coefficient section of the computing machine of FIG. 11.
Figure 7:
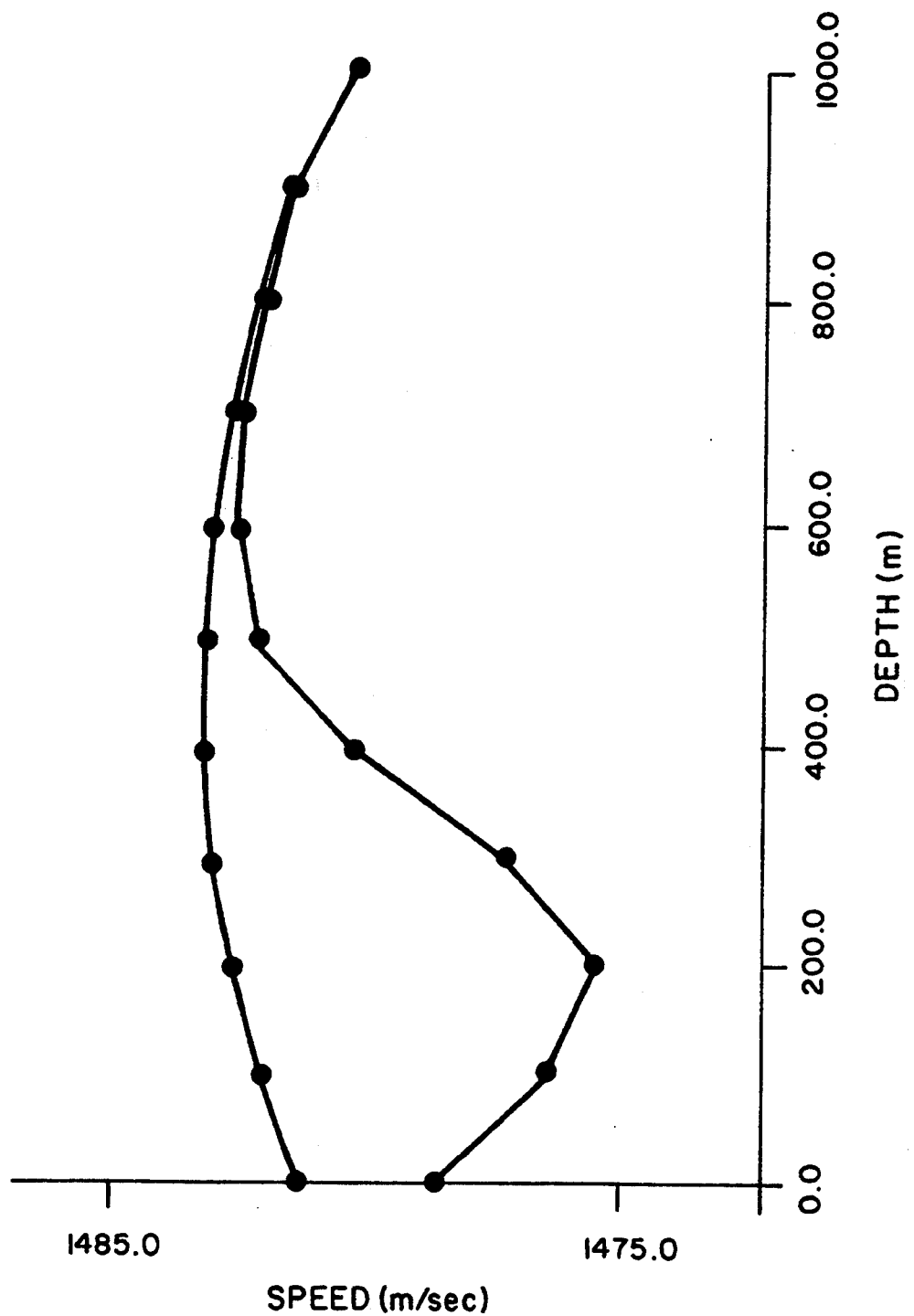
FIG. 7 is a graph of the eigenfunctions $g_1$ and $g_2$ calculated in this example.
Figure 10:
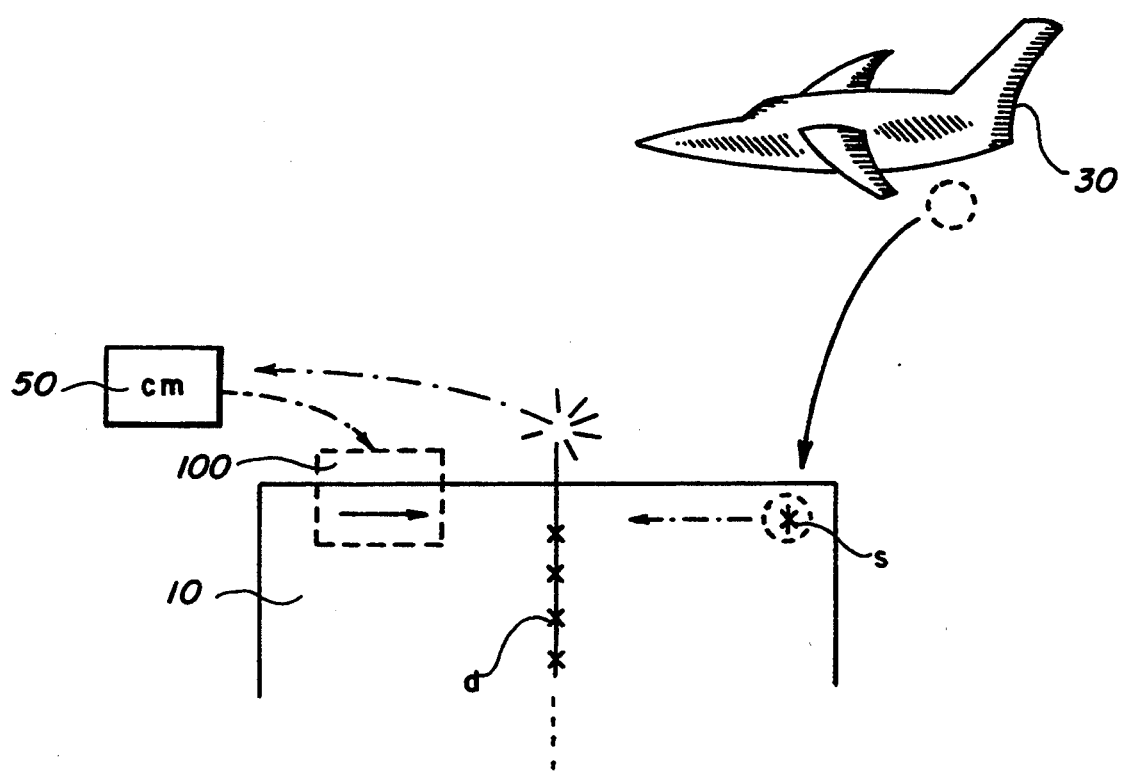
FIG. 10 illustrates the structure of the invention.
Figure 11:
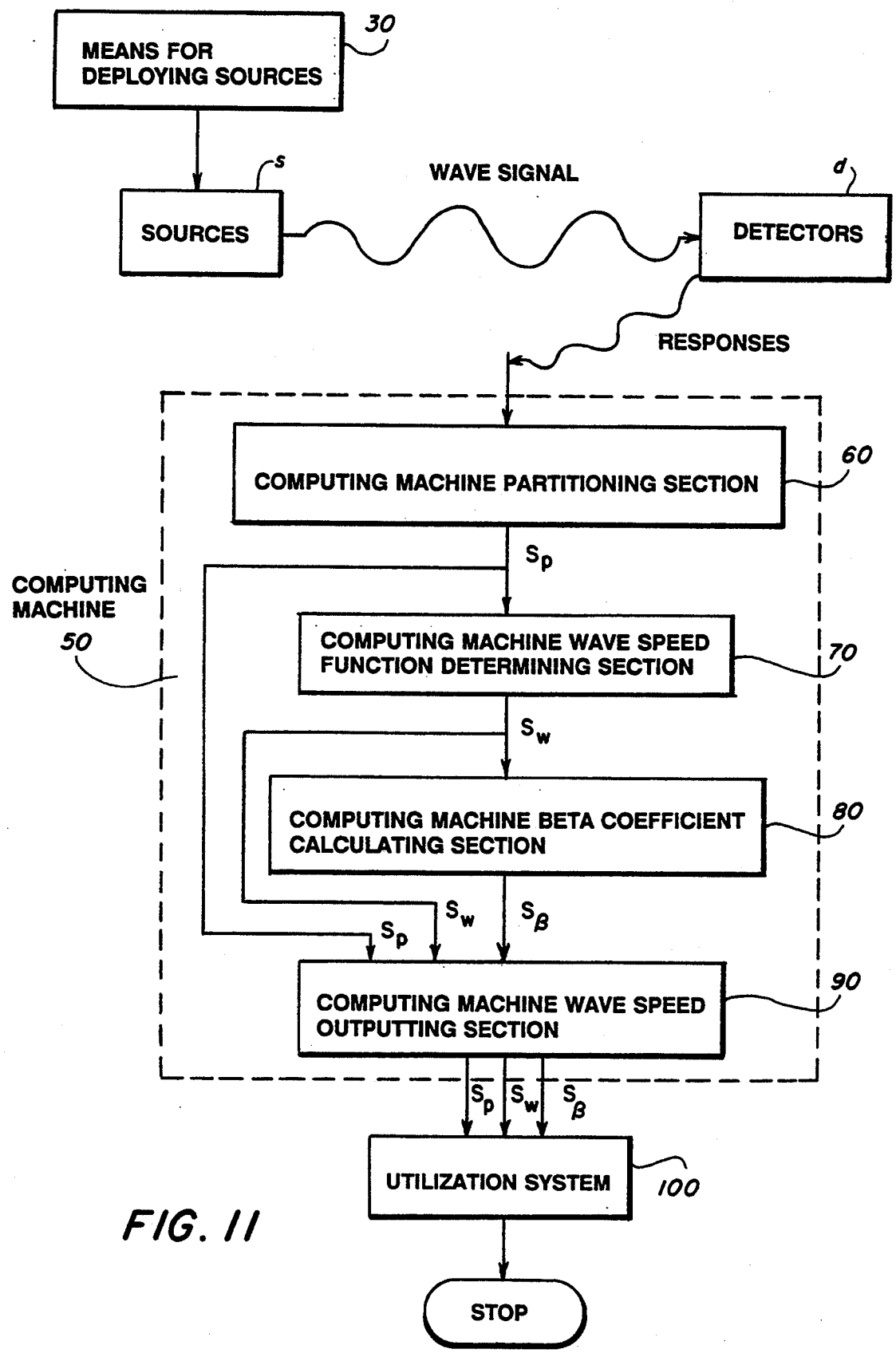
FIG. 11 shows in block diagram form the structure of the invention.

The method according to the present invention for determining the wave speed is depicted in block diagram representation in FIGS. 5 and 6 and the apparatus for determining the wave speed is shown in FIGS. 10 and 11.

Referring now to FIGS. 5, 10 and 11, acoustic signals with known harmonic components having angular frequencies $\omega_s$ are transmitted by the sources s. In the preferred embodiment, the harmonic component has angular frequencies $\omega_s$ between $20\pi$ and $60\pi$ radians/sec. As shown in FIGS. 10 and 11, means 30 for selectively deploying the sources s may include one or more airplanes for air deploying a small number of fast, inexpensive, air deployed explosives, that is, acoustic shots, with a high signal to noise ratio. The shots explode near the surface of the medium thereby transmitting acoustic signals in the medium. In the example herein, 36 such air deployed acoustic shots constitute sources spaced equally around the perimeter of the region 10 and 12.5 km from the perimeter, at intervals of 25 km. The signals are identified with their transmitting source by order of deployment and therefore transmission the times between transmission of consecutive shots is sufficient to enable distinction of the signals.

In general, the signals from different sources may be distinguished by any means recognizable at the detectors. For example, they may be encoded by pulses or by carrier waves of different frequencies.

The signals transmitted in the example herein all have a $40\pi$ radians/sec angular frequency component. In other words, $\omega_s = 40\pi$ radians/sec for all sources. Such a signal in a medium with a 1500 m/sec. sound speed would have a 75 m wavelength. The results using such a frequency would not be affected by the movement of fish, waves, or by other minor environmental disturbances, which are generally far less than the wavelength. The signals need not be of duration longer than several seconds. Furthermore, imprecise knowledge of the location of sources and detectors of up to about 100 m (about one wavelength or less) do not significantly effect the accuracy of the results herein.

Although this example uses the same frequency for all signals, in general, the invention provides accurate results for signals having different frequency components.

Figure 8A:
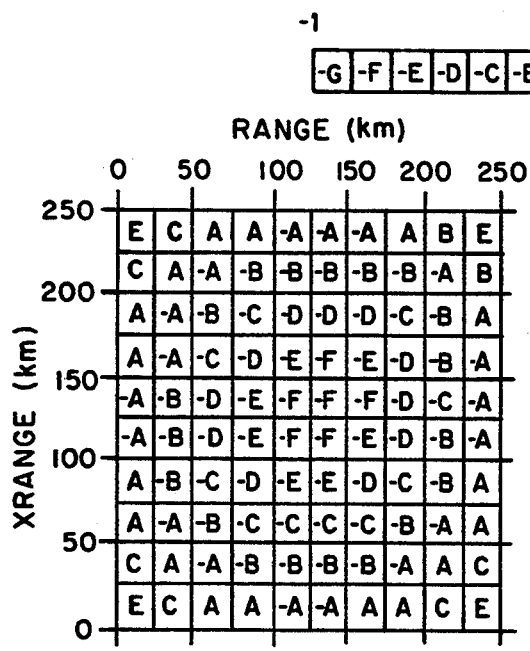
FIG. 8 illustrates computed beta coefficients.
Figure 8B:
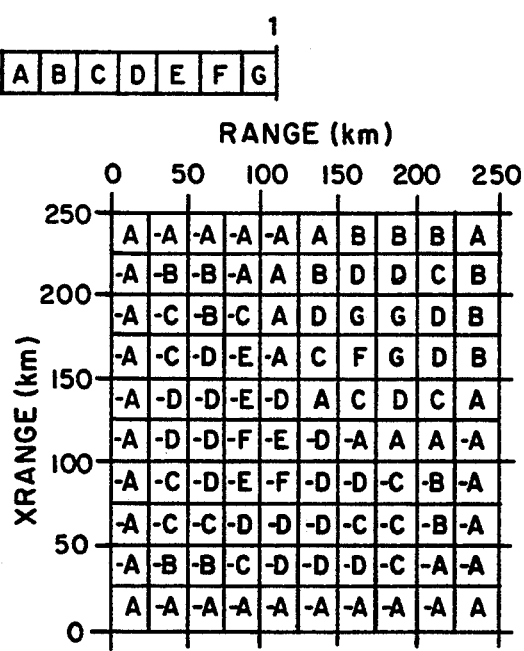
Figure 9A:
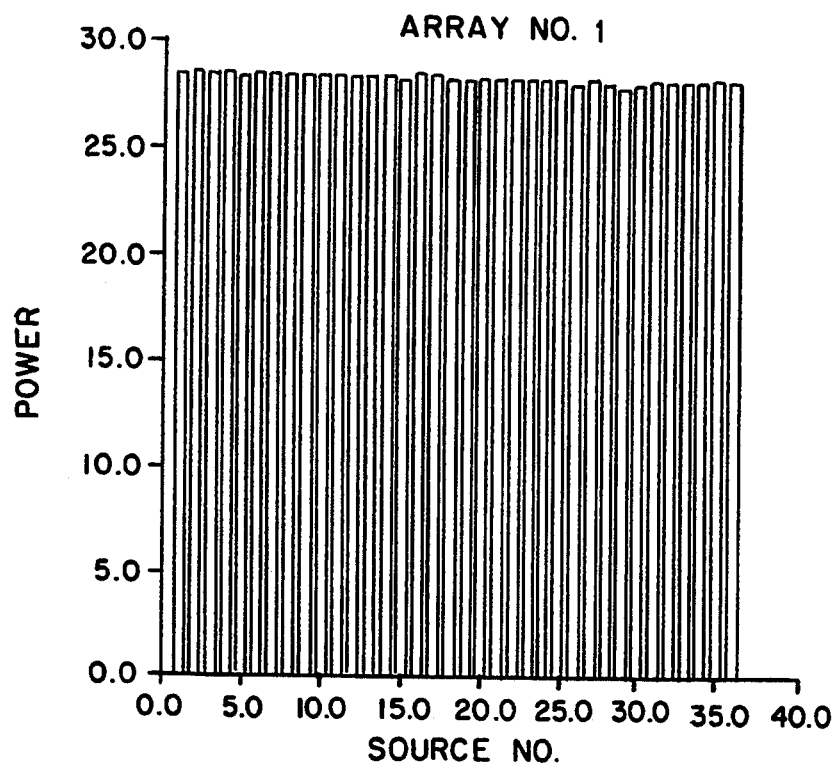
FIG. 9 shows the final values of matched field processing power calculated in this example.
Figure 9B:
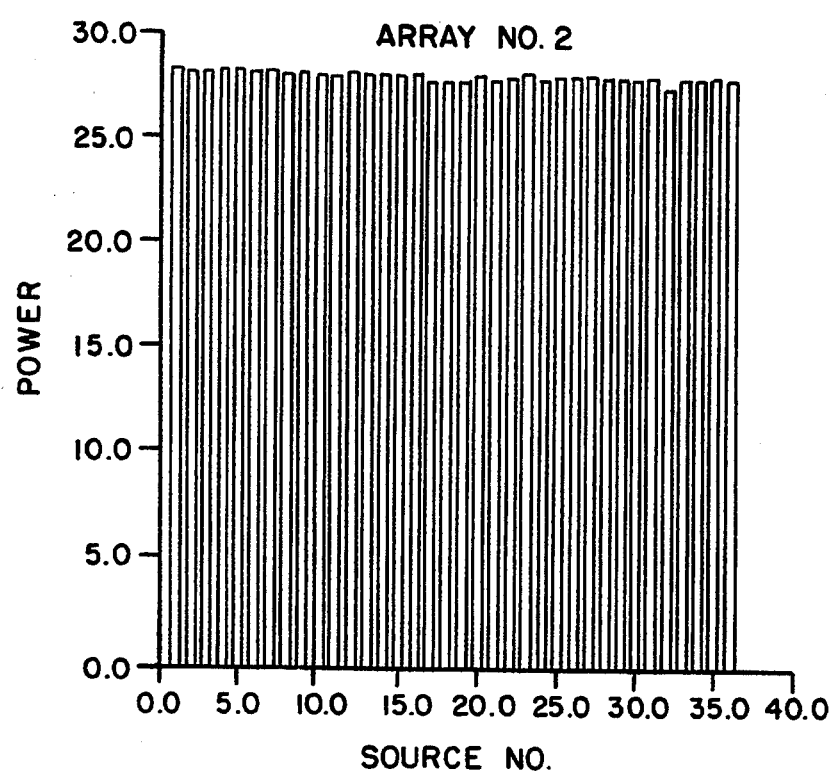
Figure 9C:
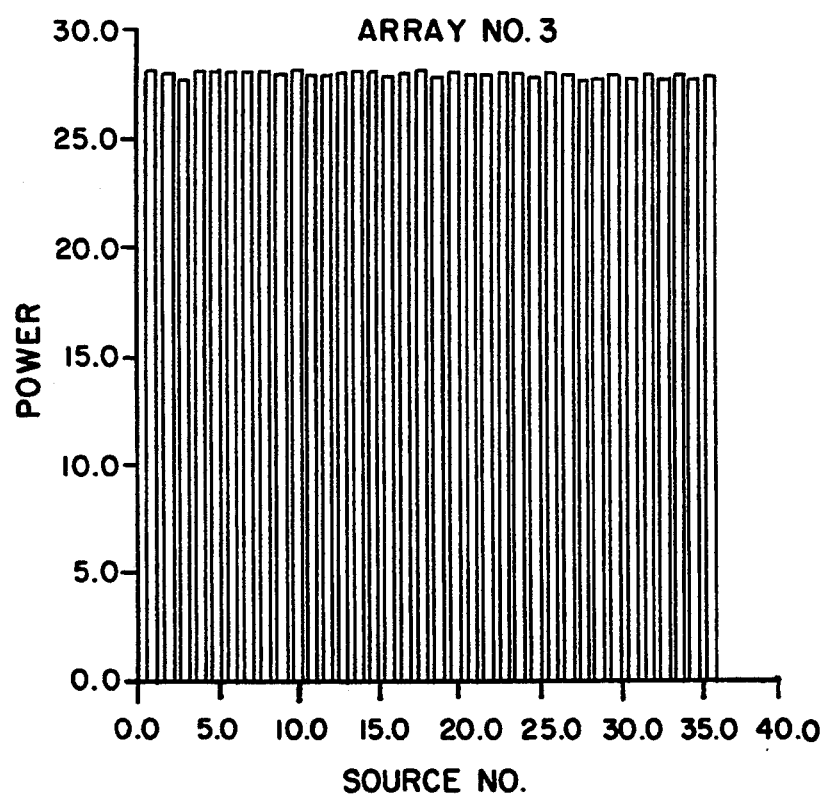
Figure 9D:
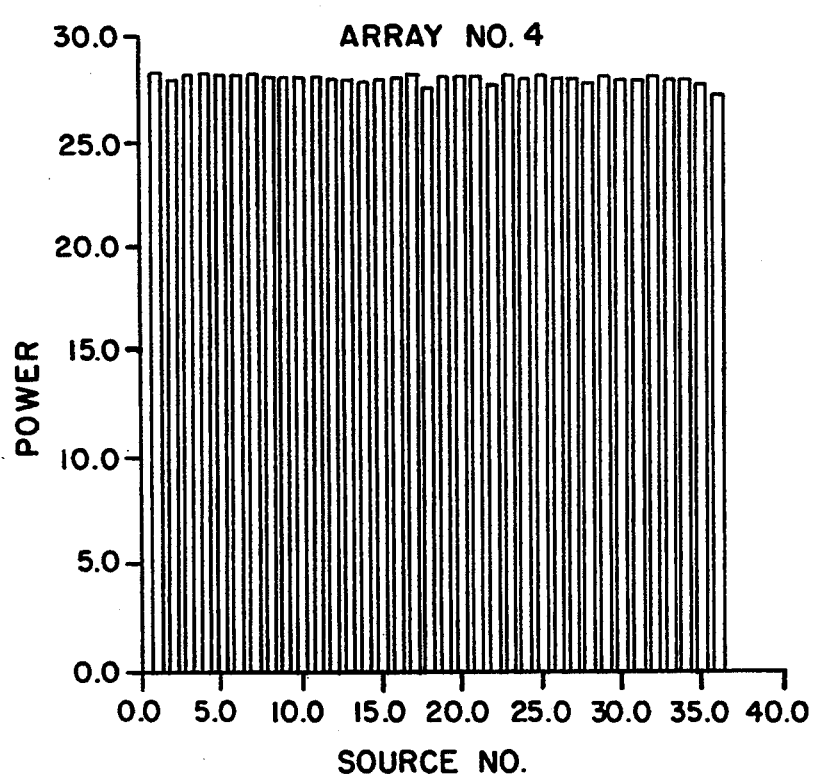

The example herein involves simulating the operation of the invention in a 250 km $\times$ 250 km $\times$ 1.00 km medium with known sound speed. It is designed to be an accurate model of a deep water region of the North Pacific ocean. The simulated sound speed at position $p=(x,y,z)$, where $0 \leq x,y \leq 250$ km and $0 \leq z \leq 1.00$ km is $$v(x,y,z) = v_0(z) + \Delta C_1(x,y,z) + \Delta C_2(x,y,z),$$

where $$\Delta C_w(x, y, z) = \Delta_w \cdot e^{-(\frac{r_w}{R_w})^2 - [\frac{(z-z_w)}{Z_w}]^2},$$

$$r_w = \sqrt{(x - x_w)^2 + (y - y_w)^2},$$

and where $w=1$ or 2, $\Delta_1 = -10$ m/sec., $\Delta_2 = -5$ m/sec., $(x_1,y_1) = (125$ km, $125$ km$)$, $(x_2, y_2) = (175$ km, $175$ km$)$, $R_1 = 100$ km, $R_2 = 50$ km, $z_1 = 500$ m, $z_2 = 200$ m, $Z_1 = 500$ m, and $Z_2 = 200$ m, and $v_0$ is as shown in FIG. 8.

The example will involve simulating measurements based on this sound speed equation, and performing calculations based on these simulated measurements.

In this example, 4 detectors are selectively positioned in the interior of the region 10. The detectors are hydrophone arrays spaced every 37.5 m vertically with the top phone being just below the surface. In other words, the phones are spaced approximately every half wavelength.

In general, the detectors may have any number of individual receivers. Each detector measures responses, referred to as wave amplitude, over time, in a manner sufficient to distinguish between detected signals transmitted from different sources.

The 4 hydrophones are positioned in a horizontal square, each being 87.5 km from the nearest corner of the region 10. Regardless of location, in general, at least 3 hydrophones are necessary to obtain accurate results for the acoustic structure of an ocean mesoscale region.

Data obtained at the detectors d is then transmitted to a computing machine 50, such as a Convex mainframe computer, for calculation of the wave speed, such as by using programs written in the FORTRAN language.

In order to determine the wave speed at every location in the region 10 based on the above data, positions in the region must be spatially represented. As shown in FIGS. 3, 4, 5 and 11, the partitioning section 60 of the computing machine 50 performs this step by partitioning the region so that it is represented as a finite set of discrete cells (20) and each of said detectors (d) is in a different cell (20) than all sources (s). The partitioning section 60 generates a partitioning signal $S_p$ indicative of the partitioning.

Let M be the number of cells (20). The cells (20) are each identified by a unique positive integer i (cell number) no greater than M. The partition is the set of all cells $C_i$, where $1 \leq i \leq M$. Since the cells (20) are discrete, the partition covers the entire region (10), and every position p in the region (10) is in only one cell (20). The partition further involves a spatial coordinate z so that every position p in the region (10) is identified by cell number i and coordinate z.

In this example, the partition involves dividing the region into 100 equal cells of 1.00 km height. Each source and each hydrophone array is in a different cell than all other sources and hydrophone arrays. The cells are numbered 1-100, where the sources are in cells numbered 61-96, and the arrays are in cells numbered 97-100. There are no sources or detectors in cells numbered 1 to 60. The spatial coordinate z represents depth.

Although this example involves a regular, rectilinear partition, the region may in general be partitioned irregularly or, non-rectilinearly, as for example where the spatial coordinate z represents angle or radial distance.

The wave speed function determining section 70 of the computing machine 50 expresses the wave speed at each position as a known wave speed function w dependent on at least one coefficient beta and on depth. Each cell has at least one beta coefficient, so the beta coefficients for cell $C_i$ are $\beta_1^i, \beta_2^i, \ldots, \beta_N^i$. In other words, $v_i(z) = w(\beta_1^i, \beta_2^i, \ldots, \beta_N^i, z)$. It is noted that the wave speed function w does not vary from cell to cell. However, the beta coefficients $\beta_1^i, \beta_2^i, \ldots, \beta_N^i$ and therefore the function $v_i$ can vary from cell to cell. The wave speed function determining section 70 generates a wave speed function signal $S_w$ indicative of the wave speed function.

In the preferred embodiment, calculation of the wave speed based on the above data relies on a modified empirical orthogonal function (M.E.O.F.) model by which the wave speed at position p, identified by cell number i and coordinate z, is $$v_i(z) = w(\beta_1^i, \beta_2^i, \ldots \beta_N^i, z) = \frac{1}{\sqrt{h(z)x + \sum_{j=1}^{N} \beta_j^i \cdot g_j(z)}},$$

where $v_i$ is the wave speed in cell $C_i$ as a function of z, $\beta_j^i$ is the $j^{th}$ beta coefficient for cell $C_i$, h is a known mean function of z, and $g_j$ are known modified empirical orthogonal functions of z, for $1 \leq i \leq M$ and $1 \leq j \leq N$. According to the M.E.O.F. model, the functions $g_j$ and h do not vary from cell to cell. Only the coefficients $\beta_j^i$ vary from cell to cell, as indicated by the index i. The wave speed in cell $C_i$ is characterized as a wave speed profile—it varies as z is varied according to the above equation. The wave speed function determining section 70 of the computing machine 50 determines the wave speed function w by determining the functions h and $g_j$.

The M.E.O.F. model is based on K sample profiles at L depths each, which sample profiles can come from archival, A.X.B.T., C.T.D. or other similar data. In the embodiment of this example, profiles are sampled at the centers of the 36 cells on the perimeter (K=36) and at 10 depths (L=10). The L×L matrix M is defined by entries $$M_{ab} = \frac{1}{K} \sum_{k=1}^{K} \left( \frac{1}{v_k^2(z_a)} - \frac{1}{v_{mean}^2(z_a)} \right) \left( \frac{1}{v_k^2(z_b)} - \frac{1}{v_{mean}^2(z_b)} \right),$$

where $$\frac{1}{v_{mean}^2(z)} = \frac{1}{K} \sum_{k=1}^{K} \frac{1}{v^2(z)}.$$

The wave speed satisfies the equation $$\frac{1}{v_i^2(z)} = \frac{1}{v_{mean}^2(z)} + \sum_{j=1}^{L} \beta_j^i \cdot g_j(z).$$

where $g_j$ is the j-th eigenfunction of the matrix M and $v_{mean}$ is defined as above. These functions are readily determined by known techniques. In this example, accurate results are obtained by ignoring $g_j$ for j greater than N, where N=2. In other words, the M.E.O.F. expression of sound speed satisfies $$\frac{1}{v_i^2(z)} = h(z) + \sum_{j=1}^{2} \beta_j^i \cdot g_j(z)$$

where $$h(z) = \frac{1}{v_{mean}^2(z)}.$$

Normalized curves for $g_1$ and $g_2$ as determined in this example are shown in FIG. 9.

In general, the functions h and $g_j$ are determined by means known to those skilled in the art. In other words, it is known how the wave speed varies within each cell $C_i$ pursuant to functions h and $g_j$. However, those situations where $$h(z) = \frac{1}{v_{mean}^2(z)}$$

are particularly useful for calculating perturbation normal mode wave numbers since the functions $v^i$ and $v_{mean}$ have the property $$\frac{1}{v_i^2(z)} - \frac{1}{v_{mean}^2(z)} = \sum_{j=1}^{N} \beta^j \cdot g_j(z).$$

The beta coefficient section 80 of the computing machine 50 calculates the beta coefficients and generates a beta coefficient signal $S_B$ indicative of the at least one beta coefficient as shown in FIG. 6.

In calculating the beta coefficients, a distinction is made between cells through which some signals pass, and cells through which no signals pass. If the signal transmitted at source s and detected at detector d would theoretically pass through cell $C_i$, then $\Delta_{s,d,i}$ is defined as the length of the path of this signal in cell $C_i$. On the other hand, if this signal would not theoretically pass through cell $C_i$, then $\Delta_{s,d,i}$ is defined as 0. The set of cells through which some signal passes is denoted T. In other words, T={$C_i$ such that $\Delta$s,d,i$\neq$0 for some s,d}. In the preferred embodiment, the cells containing sources or detectors are not considered to be in T. In particular, $C_i \epsilon$ T for $1 \leq i \leq 60$ and $C_i \epsilon$ T for $61 \leq i \leq 100$. Accordingly, the beta coefficient calculating section 80 calculates $\Delta_{s,d,i}$ for all combinations of s, d and i as described above.

The beta coefficient calculating section 80 determines the values of $\beta^j$ for those cells $C_i$ through which no signals pass (in other words, $C_i \epsilon$ T), by means known to persons skilled in the art. For example, these values could be determined by using A.X.B.T., C.T.D. or archival data. As explained further below, the beta coefficient calculating section 80 may also calculate modal coefficients $A_{j,m}$ for all modes m and indices $1 \leq j \leq N$. For all other cells, that is, cells $C_i$ through which some signal passes ($C_i \epsilon$T), the beta coefficient calculating section 80 then determines the values of $\beta^j$ which maximize the matched field processing power by the method discussed further below.

The next step is to determine the matched field processing power $P_{s,d}$ for signal transmitted at source s and received at detector d so that the beta coefficient which maximizes it can be determined.

The matched field processing power correlation $P_{s,d}$ model used in this example uses the Capon processor (with S/N=10 dB.) and the adiabatic normal mode theory considering only the waterborne modes. This model assumes that bottom interacting energy has been mode filtered out or time gated out. This propagation model used further does not provide for full 3-dimensional effects. In other words, there is no horizontal refraction. The horizontal component of a signal path is a straight line. This invention is not limited to such models and would work with other matched field processing and propagation models known in the art.

In order to use any normal mode propagation model to calculate the acoustic field in the cell, and then calculate the acoustic power through the cell, it is necessary to determine eigenvalues $\lambda_m$ and eigenfunctions $\phi_m$ for normal mode m, which satisfy the Helmholtz equation $$\frac{\partial^2 \phi_m(z)}{\partial z^2} + \frac{\omega^2}{v_0^2(z)} \cdot \phi_m(z) = 0$$

where $v_0$ is the sound speed in the unperturbed environment. In other words, $$v_0(z) = \frac{1}{\sqrt{h(z)}}.$$

In the preferred embodiment which uses M.E.O.F. in which $$h(z) = \frac{1}{v_{mean}^2(z)},$$

$v_0 = v_{mean}$.

If L denotes the operator $$\frac{\partial^2}{\partial z^2}$$

and V denotes the operator $$\frac{\omega^2}{v_0^2(z)},$$

then the eigenvalues and eigenfunctions satisfy the equation $(L+V)\phi_m = \lambda_m \cdot \phi_m$. The normal modal wave numbers $k_m(i)$ for mode m and cell number i needed for calculation of the matched field processing power are then calculated as $$k_m(i) = \sqrt{\lambda_m}.$$

In general, the values of $\lambda_m$ and $k_m(i)$ are calculated anew for each cell.

The preferred embodiment calculates the normal modal wave numbers by using perturbation normal mode wave numbers. The derivation of this method involves the perturbation operator $$\partial V = \frac{\omega^2}{v^2(z)} - \frac{\omega^2}{v_0^2(z)}.$$

In M.E.O.F., the difference between the inverse of the wave speed (v) squared and the inverse of the mean wave speed ($v_{mean} = v_0$), in other words, $$\frac{1}{v_i^2(z)} - \frac{1}{v_{mean}^2(z)},$$

is a linear sum of basis functions. This difference corresponds to the perturbation operation. Therefore the perturbation normal mode wave number $k_m(i)$ associated with mode m and perturbation cell $C_i$ may be approximated as a normal mode wave number $k_m(0)$ associated with the unperturbed environment ($v = v_{mean} = v_0$) plus a perturbation normal mode wave number $\delta k_m(i)$. In other words, $k_m(i) = k_m(0) + \delta k_m(i)$. The unperturbed normal mode wave numbers $k_m(0)$ need only be calculated once, and the perturbation normal mode wave numbers are readily calculated as $$\delta k_m(i) = \omega \cdot \sqrt{\sum_{j=1}^{N} \beta^j \cdot A_{j,m}}$$

where $$A_{jm} = \int \Psi^2_{m,o}(\zeta) \cdot g_j(\zeta) d\zeta$$

over all depth $\zeta$ values in perturbation cell $C_i$. The coefficients $A_{j,m}$ need only be calculated once. Therefore, this perturbation normal mode wave number calculation provides efficient determination of the acoustic field.

Further explanation and details of perturbation normal mode wave numbers are found in Tolstoy, A. et al., "Acoustic Tomography in Matched Field Processing", Journal of the Acoustical Society of America, vol. 89, pp. 1119 ff. (March, 1991), which is incorporated herein by reference.

The perturbation normal mode wave number calculation method applies to any normal mode propagation model in addition to the adiabatic model, including, for example, the coupled normal mode model.

Coefficients $\beta_j^i$ for $C_i \in T$ and $1 \leq j \leq N$ are then calculated (the beta calculation step) so that these values maximize $P_{s,d}$ for all sources s and detectors d. In the preferred embodiment, the calculation is performed for $1 \leq i \leq 60$ and $1 \leq j \leq 2$ by beta backpropagation. Beta backpropagation entails iteratively solving for $\beta_j^i$ where for a particular source s and detector d, a candidate $\gamma_j^i(s,d)$ is selected by means known in the art, so that it maximizes $P_{s,d}$. For example, straightforward iteration or a modified Newton-Raphson method could be used. $\beta_j^i$ is then reset as the weighted average over all sources s and detectors d of $\gamma_j^i(s,d)$, where the weighting coefficient is the length of the path through cell $C_i$ of the signal from source s to detector d. Specifically, $$\beta_j^i = \left( \sum_{s,d} \gamma_j^i(s,d) \cdot \Delta_{s,d,i} \right) \cdot \left( \sum_{s,d} \Delta_{s,d,i} \right)^{-1}.$$

In the example herein, the beta backpropagation involves a first loop iteration over i, starting with i=1, for $1 \leq i \leq 60$. For example, $\beta_1^i$ and $\beta_2^i$ are determined before $\beta_1^{i+1}$ and $\beta_2^{i+1}$.

Based on the above model, it is estimated for the example that all values of $\beta_1^i$ and $\beta_2^i$ fall within the ranges $-135.*10^{-10} \leq \beta_1^i \leq 25.*10^{-10}$ and $-10.*10^{-10} \leq \beta_2^i \leq 30.*10^{-10}$. Accordingly, for $1 \leq i \leq 60$, $\beta_1^i$ is initialized to $-55.*10^{-10}$ and $\beta_2^i$ is initialized to $10.*10_{-10}$.

For each value of i, a second loop nested inside the first i loop involves iterating through all sources s and all detectors d. If the signal from source s to detector d passes through cell $C_i$, then $\gamma_j^i(s,d)$ is determined by iteration means known in the art, to maximize $P_{s,d}$. In this example, $\gamma_1^i(s,d)$ and $\gamma_2^i(s,d)$ are calculated simultaneously. All possible values of $\beta_1^i$ and $\beta_2^i$ within the above ranges, in increments of $1.*10^{-10}$, (therefore approximately $161*41 = 6,601$ candidates) are considered, and the corresponding values of $P_{s,d}$ are compared. Those values, called $\beta_1^{i*}$ and $\beta_2^{i*}$ which maximize $P_{s,d}$ are identified. Possible values within the range $1.*10^{-10}$, and in increments of $0.1*10^{-10}$ about $\beta_1^{i*}$ and $\beta_2^{i*}$ (approximately $21*21 = 441$ values) are next considered as candidates. Those values which maximize $P_{s,d}$ are then denoted $\gamma_1^i(s,d)$ and $\gamma_2^i(s,d)$.

Once $\gamma_1^i(s,d)$ and $\gamma_2^i(s,d)$ are determined for all sources and detectors, then $\beta_1^i$ and $\beta_2^i$ are reset to $$\beta_j^i = \left( \sum_{s,d} \gamma_j^i(s,d) \cdot \Delta_{s,d,i} \right) \cdot \left( \sum_{s,d} \Delta_{s,d,i} \right)^{-1}$$

for j=1 and 2.

The resetting of $\beta_j^i$ for all values of i and j, starting with i=1, is call a sweep. Once a sweep is finished, thereby resetting the values for the beta coefficients, then another sweep is performed, with the new values, and the process continues repeating until $P_{total}$ (the sum of $P_{s,d}$ over all sources s and detectors d) increases by less than a predetermined amount or until a predetermined number of iterations have been performed. For the example discussed, favorable results were obtained for 31 sweeps, with sound speed error of less than 0.2 m/sec. FIG. 10 shows the final values of $P_{s,d}$ for all sources and detectors as determined in this example.

Having determined the beta coefficients, the speed of propagation of a signal through the medium is now readily determinable at any position p in the region 10. The position is identified by cell number i of the partition and by coordinate z, such as depth. For the preferred embodiment, the wave speed at position p is then $$v_i(z) = w(\beta_1^i, \beta_2^i, \ldots, \beta_N^i, z) = \frac{1}{\sqrt{h(z) + \sum_{j=1}^{N} \beta_j^i \cdot g_j(z)}}.$$

Since the functions h and $g_j$ and all coefficients $\beta_j^i$ are known, the wave speed can be readily calculated.

Returning now to FIGS. 5 and 11, the outputting section 90 of the computing machine 50 outputs the partitioning signal $S_p$, the wave speed function signal $S_w$, and the beta coefficient signal $S_B$.

Sonar systems and systems for remote sensing, mapping and study of ocean and geological structures in which it is useful to know the wave speed in the medium can use the partitioning signal $S_p$, the wave speed function signal $S_w$, and the beta coefficient signal $S_B$. Systems which utilize the wave speed in the medium are referred to generically as utilization systems 100.

The utilization system 100 determines the wave speed at a given position by using the partitioning signal $S_p$, the wave speed function signal $S_w$, and the beta coefficient signal $S_B$. The utilization system 100 uses the partitioning signal $S_p$ to associate the position with a cell number and a depth. The utilization system 100 uses the beta coefficient signal $S_B$ to associate that cell number with at least one beta coefficients. The utilization system 100 uses the wave signal function signal $S_w$ to associate the at least one beta coefficients and the depth variable associated with that cell number and the depth, respectively, with a wave speed. The utilization system 100 thereby calculates the wave speed at a plurality of positions in the region.

The utilization system 100, for example, a sonar system, utilizes the wave speed as calculated above at a plurality of positions in the medium to transmit and receive waves in the region and to analyze the results thereof. Accurate knowledge of the wave speed along the expected path of the wave provides for more accurate transmittal, reception, and analysis of the results thereof.

It will be understood that the embodiments described herein are only illustrative of the invention and numerous other arrangements and implementations of the invention may be derived by those skilled in the art without departing from the spirit and scope of the invention.

What is claimed is:

1. A computer implemented method for determining the wave speed within a region of a medium comprising the steps of:

(a) transmitting one or more signals from one or more sources disposed at discrete locations within the region, wherein each signal has a known harmonic component;

(b) detecting the one or more signals by use of one or more detectors disposed at discrete locations within the region so as to measure the detected signals and to identify the source from which each detected signal was transmitted;

(c) transmitting the measured signals to a computing machine; and (d) said computing machine responsive to the measured signals determining the wave speed components by performing the steps of:

(i) partitioning the region into a plurality of cells so that each cell is indexed with a cell number so that each position in the region is represented by a cell number and a depth variable and so that each cell has at least one associated beta coefficient, said partitioning step comprising generating a partitioning signal indicative of the partitioning;

(ii) determining a wave speed function responsive to the partitioning signal, the wave speed function being for specifying the wave speed as a function of the at least one beta coefficient and the depth variable, the wave speed function determining step comprising generating a wave speed function signal indicative of the wave speed function;

(iii) calculating matched field processing power responsive to the partitioning signal and to the wave speed function signal, the matched field processing power being a correlation in the frequency domain of the signals measured by detecting step (b) with values predicted using the wave speed function of step (d)(ii);

(iv) calculating the at least one beta coefficient for all cells in the region so as to simultaneously maximize the matched field processing power calculated in step (d)(iii) for all source—detector combinations, said beta coefficients calculating step comprising generating a beta coefficient signal indicative of the at least one beta coefficient; and (v) outputting the partitioning signal, the wave speed function signal and the beta coefficient signal.

2. The method of claim 1 wherein the calculating beta coefficients step (d)(iv) comprises the steps of:

determining the beta coefficients for all cells through which no signals pass;

determining by beta backpropagation the beta coefficients for all cells through which signals pass for at least one source-detector combination, said beta backpropagation step comprising iteratively:

determining for each cell and each source-detector combination, at least one gamma coefficient so that the at least one gamma coefficient for that cell and that source-detector combination maximizes the matched field processing power for that source-detector combination when that at least one gamma coefficient is used in place of the at least one beta coefficient for that cell in the wave speed function; and resetting the plurality of beta coefficients to the weighted average of the gamma coefficients suing the weighting factor for each cell and source-detector combination of the length of the path of the signal passing through that cell.

3. The method of claim 1 wherein the determining wave speed function Step (d)(ii) comprises the steps of:

determining a mean function dependent on depth, and determining at least one modified empirical orthogonal function dependent on depth so that the wave speed function is the inverse square root of the sum or the mean function and the linear combination of the at least one beta coefficients multiplied by the at least one modified empirical orthogonal function.

4. The method of claim 3 wherein the beta coefficient calculating step (d)(iv) further comprises the step of calculating the matched field processing power using a normal mode propagation model by using perturbation techniques.

5. The method of claim 1 wherein said transmitting step (a) comprises the step of transmitting acoustic signals for propagation in ocean water.

6. The method of claim 5 wherein said transmitting step (a) comprises the steps of transmitting signals having angular frequencies between 20 $\pi$ radians/sec and 60 $\pi$ radians/sec.

7. The method of claim 5 wherein said transmitting step (a) comprises the step of transmitting signals from at least one explosive for generating signals near the surface of the region.

8. The method of claim 7 further comprising the step of selectively air-deploying the explosives.

9. The method of claim 1 further comprising the steps of:

transmitting one or more signals from one or more sources disposed at locations known to an accuracy of at most one wavelength; and detecting the one or more signals by use of one or more detectors disposed at locations known to an accuracy of at most one wavelength.

10. The method of claim 1 wherein the region has a perimeter and an interior, said method further comprising the steps of:

transmitting one or more signals from a plurality of sources disposed near the perimeter; and detecting the one or more signals with a plurality of detectors disposed in the interior.

11. The method of claim 10 further comprising the step of detecting the one or more signals with a plurality of detectors, the detectors being vertically spaced hydrophone arrays.

12. The method of claim 11 further comprising the step of detecting the one or more signals with at least 3 detectors.

13. The method of claim 1 further comprising the steps of:

calculating the wave speed at a plurality of positions in the region, said calculating wave speed step being performed by a utilization system and being responsive to the partitioning signal, the wave speed function signal and the beta coefficient signal output in step (d)(iv); and utilizing the results of the wave speed calculating step (e) to transmit and receive waves in the region and to analyze the results thereof, said utilizing step being performed by the utilization system.

14. A system for determining the wave speed within a region of a medium, said system comprising:

(a) one or more sources disposed at discrete locations within the region for transmitting one or more signals having one or more harmonic components;

(b) one or more detectors disposed at discrete locations within the region for detecting the one or more signals so as to measure the detected signals and to identify the source from which each detected signal was transmitted and for transmitting the measured signals; and (c) a computing machine responsive to the measured signals for determining the wave speed components, said computing machine comprising:

(i) a partitioning section for partitioning the region into a plurality of cells so that each cell is indexed with a cell number and so that each position in the region is represented by a cell number and a depth variable and for generating a partitioning signal indicative of the partitioning;

(ii) a wave speed function section for determining a wave speed function responsive to the partitioning signal, the wave speed function being for specifying the wave speed as a function of the at least one beta coefficient and on the depth variable, and for generating a wave speed function signal indicative of the wave speed function;

(iii) a beta coefficient determining section for (1) calculating matched field processing power responsive to the partitioning signal and to the wave speed function signal, the matched field processing power being a correlation in the frequency domain of the signals measured by the one or more detectors (b) with values predicted using the wave speed function section (b)(ii);

(2) calculating the at least one beta coefficients for all cells in the region so as to simultaneously maximize the matched field processing power $P_{s,d}$ for all source—detector combinations; and (3) generating a beta coefficient signal indicative of the at least one beta coefficient; and (iv) an outputting section for outputting the partition signal, the beta coefficients signal, and the wave speed function signal.

15. The system of claim 14 wherein the beta calculation section (c)(iii) comprises:

means for determining the beta coefficients for all cells through which no signals pass;

means for determining the beta coefficients for all cells through which signals pass for at least one source-detector combination by iteratively determining for each cell and each source-detector combination at least one gamma coefficient so that the at least one gamma coefficient for that cell and that source-detector combination maximizes the matched field processing power for that source-detector combination when that at least one gamma coefficient is used in place of the at least one beta coefficient for that cell in the wave speed function, and resetting the plurality of beta coefficients to the weighted average of the gamma coefficients using the weighting factor for each cell and source-detector combination of the length of the path of the signal passing through that cell.

16. The system of claim 14 wherein the wave speed function section (c)(ii) comprises means for determining a mean function dependent on depth, and determining at least one modified empirical orthogonal function dependent on depth so that the wave speed function is the inverse square root of the sum of the mean function and the linear combination of the at least one beta coefficients multiplied by the at least one modified empirical orthogonal function.

17. The system of claim 16 wherein the beta coefficient section (c)(iii) further comprises means for calculating the matched field processing power using a normal mode propagation model by using perturbation techniques.

18. The system of claim 14 further comprising at least one source for transmitting acoustic signals in ocean water, the acoustic signals having angular frequencies between $20\pi$ radians/sec and $60\pi$ radians/sec.

19. The system of claim 18 further comprising means for selectively air-deploying explosives for generating signals near the surface of the region.

20. The system of claim 14 wherein the region has a perimeter and an interior, said system further comprising:

a plurality of sources disposed near the perimeter for transmitting one or more signals; and at least 3 detectors disposed in the interior for detecting the one or more signals, said detectors comprising vertically spaced hydrophone arrays.

21. The system of claim 13 further comprising a utilization system responsive to the partitioning signal, the wave speed function signal and the beta coefficient signal of step (c)(iv) for:

calculating the wave speed at a plurality of positions in the region; and utilizing the results of the wave speed calculating step (d)(i) to transmit and receive waves in the region and to analyze the results thereof.

* * * * *